United States Patent [19]

Sukeda et al.

[11] Patent Number: 5,313,448
[45] Date of Patent: May 17, 1994

[54] LASER DEVICE DRIVEN BY A PERIODIC WAVEFORM OPTIMIZED FOR REDUCING LASER NOISE

[75] Inventors: Hirofumi Sukeda, Kodaira; Shigeru Nakamura, Tachikawa, both of Japan

[73] Assignee: Hitachi, Ltd., Tokyo, Japan

[21] Appl. No.: 903,926

[22] Filed: Aug. 26, 1992

[30] Foreign Application Priority Data

Jun. 28, 1991 [JP] Japan .................. 3-158483

[51] Int. Cl.$^5$ ............... G11B 7/00; G11B 7/12
[52] U.S. Cl. ............... 369/121; 369/44.32; 369/116; 369/107
[58] Field of Search ............ 369/121, 110, 111, 116, 369/119, 122, 44.13, 44.14, 44.32, 107; 372/38, 31, 34, 44; 360/59, 114

[56] References Cited

U.S. PATENT DOCUMENTS

| | | | |
|---|---|---|---|
| 4,150,402 | 4/1979 | Tietze et al. | 369/121 |
| 4,480,325 | 10/1984 | Aiki et al. | 369/122 |
| 4,712,218 | 12/1987 | Ohnuki | 372/38 |
| 4,853,923 | 8/1989 | Yamada et al. | 369/110 |
| 5,007,039 | 4/1991 | Sakemoto et al. | 369/116 |
| 5,043,965 | 8/1991 | Iida et al. | 369/116 |

FOREIGN PATENT DOCUMENTS

| | | |
|---|---|---|
| 59-9086 | 2/1984 | Japan . |
| 59-171037 | 9/1984 | Japan . |
| 59-210541 | 11/1984 | Japan . |

OTHER PUBLICATIONS

IEEE Spectrum, Aug. 1979, "Ten Billion Bits on a Disk", Bulthuis et al, pp. 26–33.
National Technical Report, vol. 35, No. 2, Apr. 1989; "CMF Actuator and High Speed Access System", Moriya et al, pp. 165–171.

*Primary Examiner*—Paul M. Dzierzynski
*Assistant Examiner*—Kim-Kwok Chu
*Attorney, Agent, or Firm*—Fay, Sharpe, Beall, Fagan, Minnich & McKee

[57] ABSTRACT

The optical information recording and reproducing method and apparatus include a method for controlling a high frequency pulse current for driving a semiconductor laser device by which noise due to returning laser light is hardly produced, and an apparatus for increasing access speed owing to decrease in the weight of an optical pick-up movable part. Loser noise is suppressed satisfactorily by detecting the position of the optical pick-up movable part in a split optical system by means of a scale, and generating a pulse current for modulating the laser having a frequency optimum for reducing the laser noise to drive the semiconductor laser device.

17 Claims, 4 Drawing Sheets

LASER DEVICE DRIVEN BY A PERIODIC WAVEFORM OPTIMIZED FOR REDUCING LASER NOISE

BACKGROUND OF THE INVENTION

The present invention relates to an optical information recording and reproducing method and apparatus by which recording or reproducing of information is effected by irradiating a moving recording medium with focused laser to light, and in particular to such an apparatus having a fixed part and a movable part and being provided with split optics effecting recording and reproducing of information while moving the movable part.

As apparatuses for recording information by irradiating a recording medium with light, it has been known that (1) in an optical disk apparatus, information to be recorded is recorded in the form of uneven pits, (2) in an optomagnetic disk apparatus, information to be recorded is recorded while making it correspond to a medium, (3) in a phase change-type optical disk apparatus, reflectivity of light is varied at parts on a recording medium irradiated with light, etc. In many optical information recording and reproducing apparatuses, light for recording and reproducing information is provided by semiconductor laser devices in conjunction with optical or optomagnetic recording media.

A light beam emitted by a semiconductor laser device is collimated and focused on a small spot formed on a track of the recording medium. An optical head comprises the semiconductor laser device, the optics for collimating the light beam, the optics for irradiating the light beam to the small spot on the recording medium, etc., and is commonly housed in a casing. Accordingly position control for the small spot has often been performed by moving the optical head (refer to an article entitled "Ten billion bits on a disk", IEEE Spectrum AUGUST 1979, Pages 26-33, by K. Bulthuis et al.). However, in order to realize a high precision optical information recording and reproducing apparatus by moving the whole optical head with high speed, it is required to modify and downsize the optical head.

As to a type for moving the optical head with high speed, a split-type optical head has been proposed. In the split-type optical head, part of the optical head leading the light beam into the recording medium is split into a fixed part and a movable part. By this construction, the small, lightweight movable part is only moved to project the small spot on the recording medium, allowing correction of focusing deviation, correction of track position, and also information retrieval with high speed.

A split-type optical head has been described in detail in an article entitled "CMF Actuator and High Speed Access System", National Technical Report Vol. 35 No. 2, Apr. 1989; Pages 165-171, by Mitsuroh Moriya et al., and in an article entitled "High Speed Accessing using Split Optical Head" (SPIE Vol. 1078 Optical Data Storage Topical Meeting (1989); Pages 239-243) by K. Koumura et al.

However, such an optical head has a problem in that feedback noise of the semiconductor laser device is caused, in addition to a problem of down-sizing and reduction in weight. That is, a reflected part of the light irradiated from the semiconductor laser device to the recording medium again returns to the semiconductor laser device, which causes laser noise.

FIG. 4 shows an example of a conventional optical information recording and reproducing apparatus having a semiconductor laser device and a split-type optical head. A semiconductor laser device 1 emits a diverging linearly polarized light beam. The diverging light beam is transformed into a parallel light beam by collimating optics consisting of e.g. a collimating lens 5. The parallel light beam is passed through a polarized beam splitter 4. Then it passes through a quarter-wavelength plate 8 to be converted into a circularly polarized beam, and is bent upwardly by a mirror 12 and focused on a recording surface 14 of the recording medium 2 by an objective lens 6. The light beam irradiated on the recording surface 14 is reflected to pass back through through the objective lens 6 and to be reflected by the mirror 12 back through the quarter-wavelength plate 8. The reflected light beam thus becomes linearly polarized light whose polarization direction is perpendicular to the polarization direction of the original light beam emitted by the semiconductor laser device 1, enters the polarized beam splitter 4 and is reflected thereby to be focused by a detection lens 7 on a detector 3, where it is converted into an electric signal.

Since optical properties such as stability of lateral mode, small astigmatism, etc. are required for the laser used for the optical information recording and reproducing apparatus, a device having single modes both for lateral mode and transversal mode is used therefor. For this reason, strong coherency as well as laser noise are excited by returning light. For example, in an apparatus detecting presence or absence of light reflected by the recording medium for carrying out reproduction of information, since a quarter-wavelength plate is inserted in the optical path, it is possible to deflect most of the reflected light to the detecting system side and not to the light source side. However, a small part of the reflected light from the recording medium is fed back to the semiconductor laser device because of birefringence of a substrate of the recording medium and the characteristic fluctuations of optical parts, etc.

On the other hand, in an optomagnetic disk device, since variation in the direction of magnetization of the information recording medium is detected as rotation of the polarization plane, the quarter-wavelength plate cannot be inserted in the optical path, and thus several tens of % of the reflected light from the recording medium is fed back to the semiconductor laser device. In consideration of the reflectivity of the recording medium and the efficiency of the optical system, several % of the light emitted by the semiconductor laser device is fed back thereto as returning light. When the returning light amount exceeds several %, laser noise causes hindrance of recording and reproduction.

As to a countermeasure against the laser noise, the laser spectrum is converted into multi-mode by superposing a high frequency current on a current for driving the semiconductor laser to thereby reduce the coherency of the laser light, reducing laser noise caused by the returning light. Such a method is described in JP-B-59-9086, U.S. Pat. No. 4,712,218, JP-A-59210541. Among them, in JP-A-59-210541, assuming that the light velocity is c, the optical length between the semiconductor laser device 1 and the recording medium 2 is L, and the modulation frequency at which the laser noise becomes minimum is f, the following equation results from the above relationship, $2L/C = \frac{1}{2}f$. According to the equation, an optical length up to the recording surface of the recording medium has been determined from the frequency of the high frequency current and the light emitting point of the semiconductor laser device.

SUMMARY OF THE INVENTION

In order to increase the access speed by reducing the weight of the optical pick-up movable part in the optical information processing apparatus, the split-type optical head (split optics) to be is intended to reduce the size and the weight of the movable part by splitting the optical pick-up into the movable part and the fixed part. In most split-type optical heads, the fixed part 10 and the movable part n are split as shown in FIG. 4, for example. However, even if it is possible to enhance the high speed access by splitting the optical system into the fixed part and the movable part to reduce the size and the weight, the problem of laser noise remains, just as in an integrated-type optical system which is not split into a fixed and a movable part, that is, a light beam emitted from the semiconductor laser device is reflected from the recording medium to be again emitted to the semiconductor laser device.

In the examples of Japanese Patent No. 1282844, U.S. Pat. No. 4,712,218, and JP-A-59-210541, integrated-type optical pick-ups are used so the optical length has not varied. Therefore, as in the above examples, if the semiconductor laser device is driven by superposing a high frequency current having a certain frequency on the bias current of the semiconductor laser device, it is possible to reduce the laser noise due to the returning light. However, in the case of the split optics, the optical length L is significantly varied with movement of the optical pick-up movable part 11. So the optical length is at least varied to some extent about the radius of the recording medium. Consequently, in the case that the semiconductor laser device is driven by superposing the high frequency current having a constant frequency on the bias current of the semiconductor laser device in the conventional method, the laser noise is not reduced satisfactorily depending on the position of the optical pick-up movable part 11. Further, although JP-A-59-210541 considers of the relationship between the frequency for making the semiconductor laser device emit the light and the optical length, since a given optical length is a predetermined proper value for each head, the above technique has not been applied to the type of optical head in which the optical length is varied arbitrarily.

The object of the present invention is to provide a method of controlling the frequency of high frequency pulse current and a pulse oscillation waveform, which are not substantially influenced by reflected returning light, even if the optical length is not constant in an optical information recording and reproducing apparatus in which a semiconductor laser device is driven by the high frequency pulse current.

In order to solve the problems described above, an aspect of an embodiment of the present invention is that a recording medium such as an optical disk is irradiated with laser pulses corresponding to recording pulses so that information is recorded and reproduced by changing local characteristics of the recording medium by thermal energy of the laser pulses, wherein the laser beam is oscillated so as to generate laser pulses, and either the frequency of the high frequency current is controlled or the on-off time of the high frequency current is determined depending on the optical length between the light emitting point and the optical disk so that returning light causing the problems arrives at the laser light emitting point at a of time when the oscillation is stopped.

An apparatus for realizing the optical information recording and reproducing device according to the present invention comprises: a device for on-off modulating emitted light with a high frequency, e.g. a frequency higher than 100 MHz capable of reducing laser noise; a device for varying an optical length from a light emitting point to a recording medium; a device for discriminating the optical length; and a device for supplying a control signal to control a modulation frequency of the emitted light to the device for modulation. Further, another optical information recording and reproducing apparatus according to the present invention comprises: a device for on-off modulating emitted light with a high frequency so as to reduce laser noise; a device for varying an optical length from a light emitting point to a recording medium; and a device for setting previously the following relation:

$$T\ (on)/T\ (off) \leq L\ (min)/L\ (max)$$

where L (min) represents a minimum value of the optical length; L (max) a maximum value thereof; T (on) an on-time width of the emitted light; and T (off) an off-time width thereof.

In one of the apparatuses for realizing the optical information recording and reproducing method according to the present invention, the timing at which the light beam reflected by the recording medium reenters the light emitting surface of the semiconductor laser device is controlled.

A high speed laser driving circuit is connected with the semiconductor laser device so as to vary the frequency of the high frequency current, depending on the optical length L between the light emitting point and the recording medium. In this way, since the returning light reflected by the recording medium arrives at the light emitting point while laser oscillation is interrupted, it is possible to reduce substantially the laser noise caused by the reflected returning light.

The on-time and the off-time of the light emitted by the semiconductor laser device are set previously depending on the optical length L. Since the off-time of the light emitted by the semiconductor laser device is set so as to be longer than the on-time, the margin for variations in the phase of the light emitted by the semiconductor laser device and the returning light accompanied by variations in the optical length L is increased. That is, the returning light reflected by the recording medium reenters the light emitting surface of the semiconductor laser device during the off-time, and in this way it is possible to reduce substantially the laser noise caused by the reflected returning light.

As described above it is always possible to suppress laser noise due to the reflected returning light, regardless of the position of the light pick-up movable part, by controlling the timing at which the light beam reflected by the recording medium is injected again into the light emitting surface of the semiconductor laser device, so that it is not superposed on the light emitting timing of the semiconductor laser device. Furthermore, since laser noise can be suppressed independently of the optical length L, the problem of the laser noise in a optical system, and thus it is possible to realize an optical information processing apparatus using an optical head of small size and light weight, so that light beam access is possible.

DESCRIPTION OF THE PREFERRED EMBODIMENTS

Figure 1:
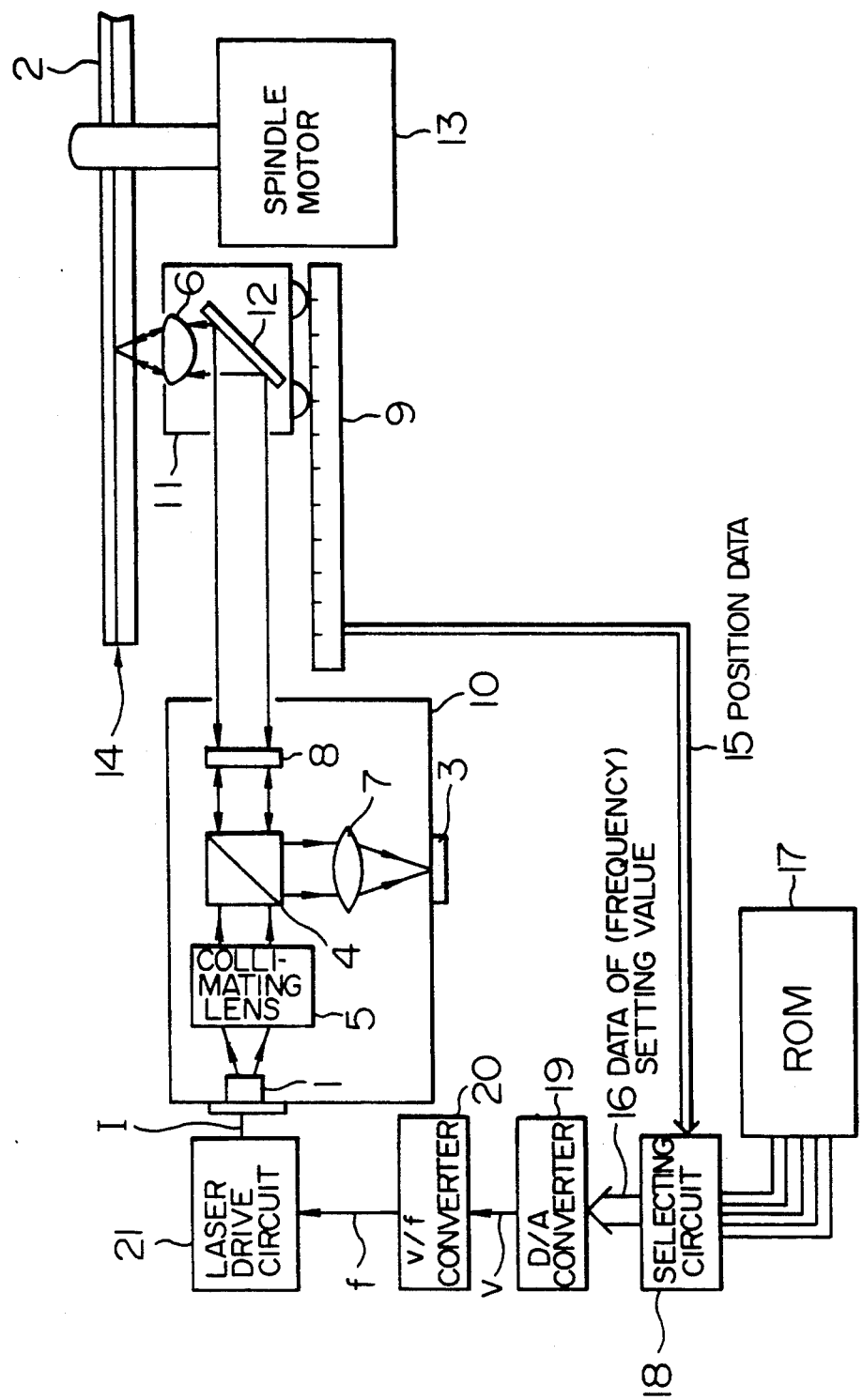
FIG. 1 is a block diagram showing an example of a construction of an optical information recording and reproducing apparatus according to the present invention, in which the oscillation frequency of the semiconductor laser device is modulated depending on the optical length.

The present invention will be explained in detail referring to the drawings

FIG. 1 shows a first embodiment of the present invention.

The optical pick-up is composed of a split optical system consisting of an optical pick-up fixed part 10 and an optical pick-up movable part 11. The recording medium 2 is a disk, in which a recording film is formed on a substrate, rotated by a spindle motor 13. The optical pick-up fixed part 10 includes a semiconductor laser device 1 and an optical system for collimating light emitted by the semiconductor laser device 1 into a parallel light beam. The optical pick-up movable part 11 receives the parallel light beam emitted by the optical pick-up fixed part 10 and focuses it on a recording surface 14 of the recording medium 11 to irradiate it therewith.

The optical pick-up movable part 11 moves in a radial direction of the recording medium 2 depending on the position. At this time, information is recorded and reproduced to or from the recording surface 14. Since only the optical pick-up movable part 11 moves, it can access information at a desired position on the recording medium 2 with higher speed than an integrate-type optical pick-up.

The optical pick-up movable part 11 is moved arbitrarily in a radial direction of the recording medium 2 by a control device not indicated in the figure to access information at a desired position. The position of the optical pick-up movable part 11 in the radial direction of the recording medium 2 is detected by means of a scale 9. Position data 15 detected by the scale 9 correspond to the optical length L from the semiconductor laser device 1 to the recording medium 2. The position data 15 are inputted to a selecting circuit 18, which is connected with a ROM 17. A table of values for setting the laser modulation frequency so as to minimize laser noise is written previously in the ROM 17.

The selecting circuit 18 selects a data set 16 of a setting value indicating the laser modulation frequency corresponding to the inputted position data 15. The data set 16 of the setting value is converted into a voltage signal V by a D/A converter 19, which is converted further into a pulse train having a frequency f by a V/f converter 20. A laser driving circuit 21 receives the pulse train, which has a frequency f, and gives the semiconductor laser device 1 a pulse current I to drive the semiconductor laser device 1 in a pulsed form. In this way, a modulation frequency for the semiconductor laser device 1 is selected on the basis of the optical length L.

The modulation frequency is so selected that returning light reflected by the recording medium 2 reenters the light emitting surface of the semiconductor laser device 1 when the semiconductor laser device 1 is emitting no light. By using the optical information recording and reproducing apparatus thus constructed, a high precision laser drive can be effected without laser noise due to the returning light.

The returning light includes returning light traveling multiple times between the semiconductor laser device 1 and the recording medium 2, in addition to light making a single round trip. Therefore, a table for setting the laser modulation frequency to be stored in the ROM is prepared in correspondence with a degree of tolerated laser noise. It is also useful to prepare the table after having judged the principal cause of the laser noise in a state where the optical pick-up including the semiconductor laser device 1 is mounted in practice.

In the first embodiment, a construction is indicated that the modulation frequency for the semiconductor laser device is varied on the basis of the optical length L and returning light from the recording medium does not reenter the semiconductor laser device 1 while emitting light. In a second embodiment, an example is indicated that the light emission time or the light emission interruption time is controlled by pulse signals depending on a region of varying the optical length.

Figure 2:
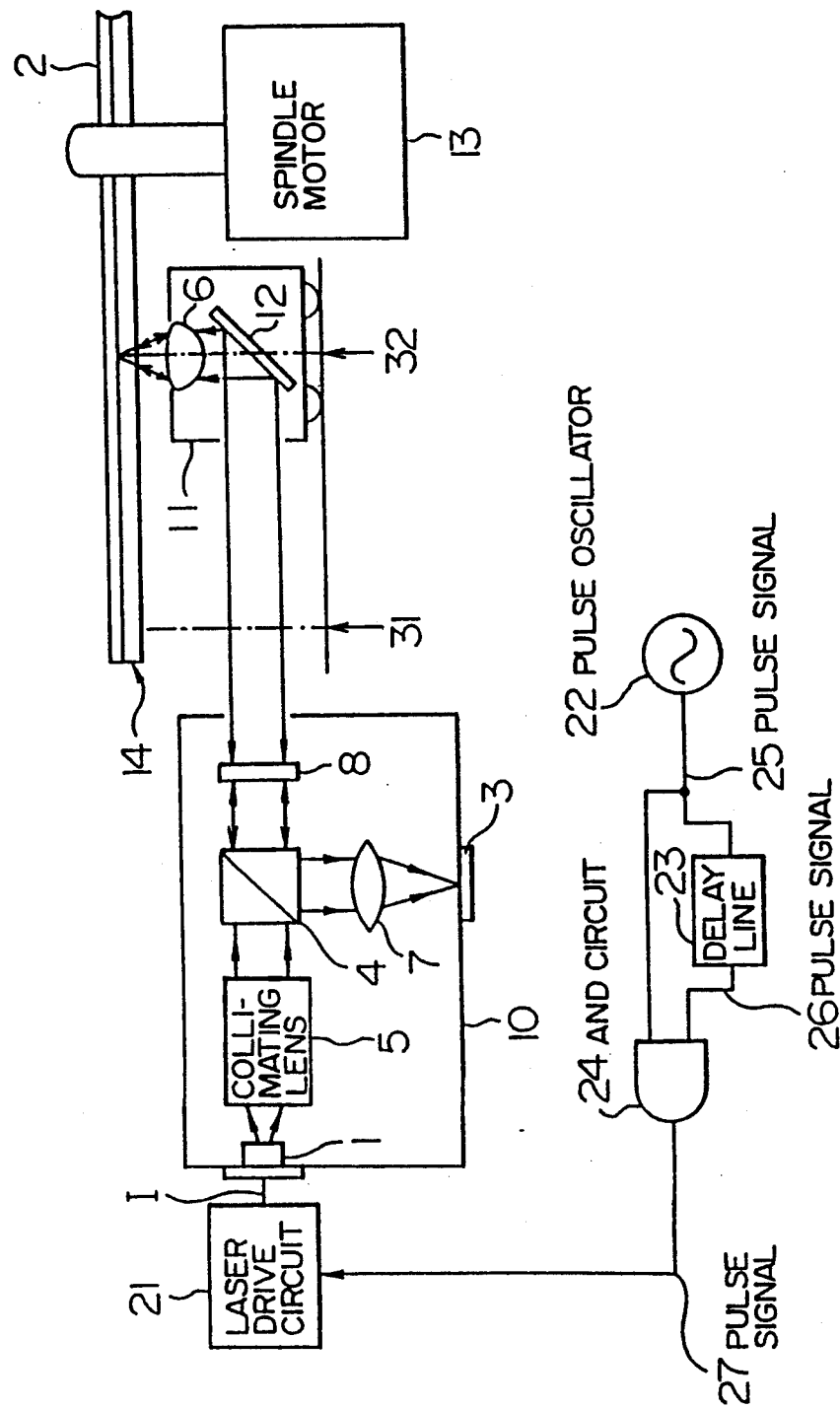
FIG. 2 is a block diagram of another embodiment, in which the light emitting timing of the semiconductor laser device is defined depending on the optical length.
Figure 3:
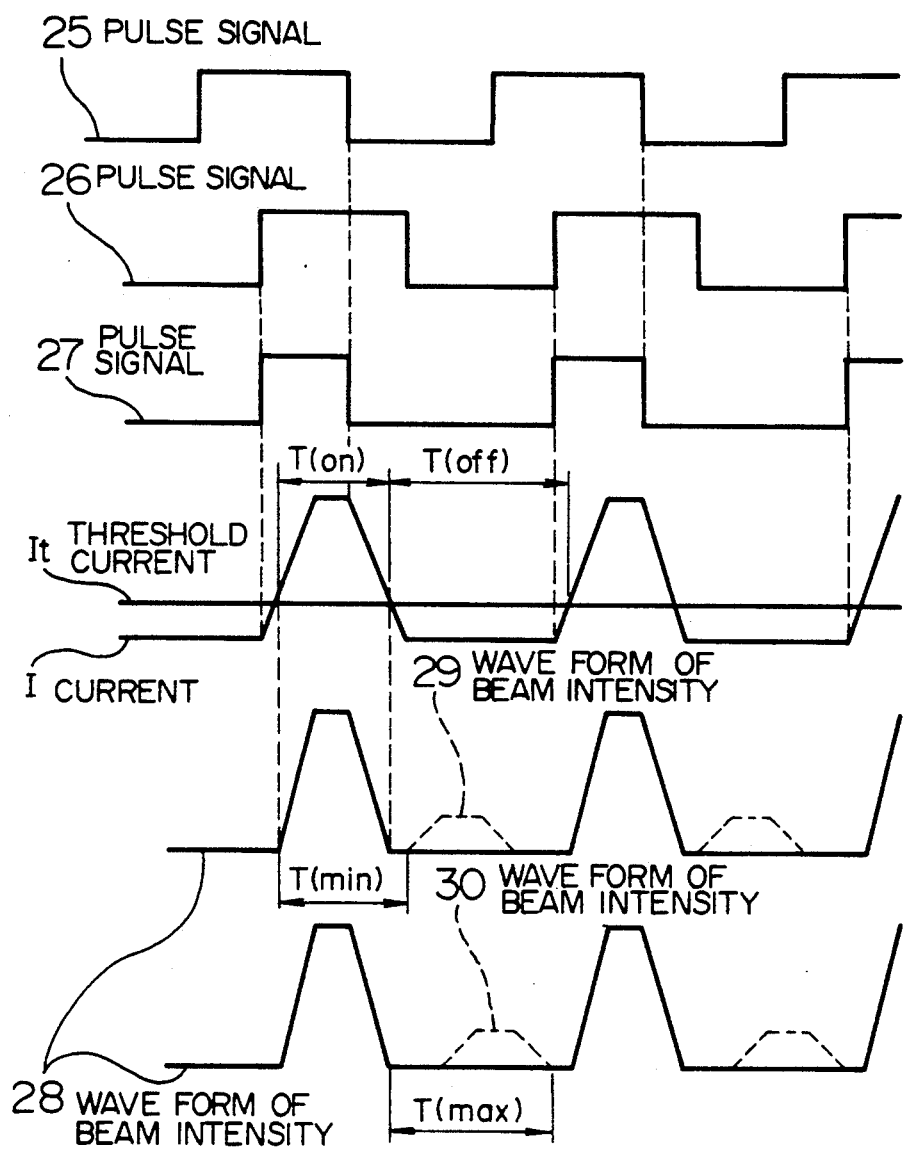
FIG. 3 shows diagrams for explaining the operation of the optical information recording and reproducing apparatus constructed as shown in FIG. 2.
Figure 4:
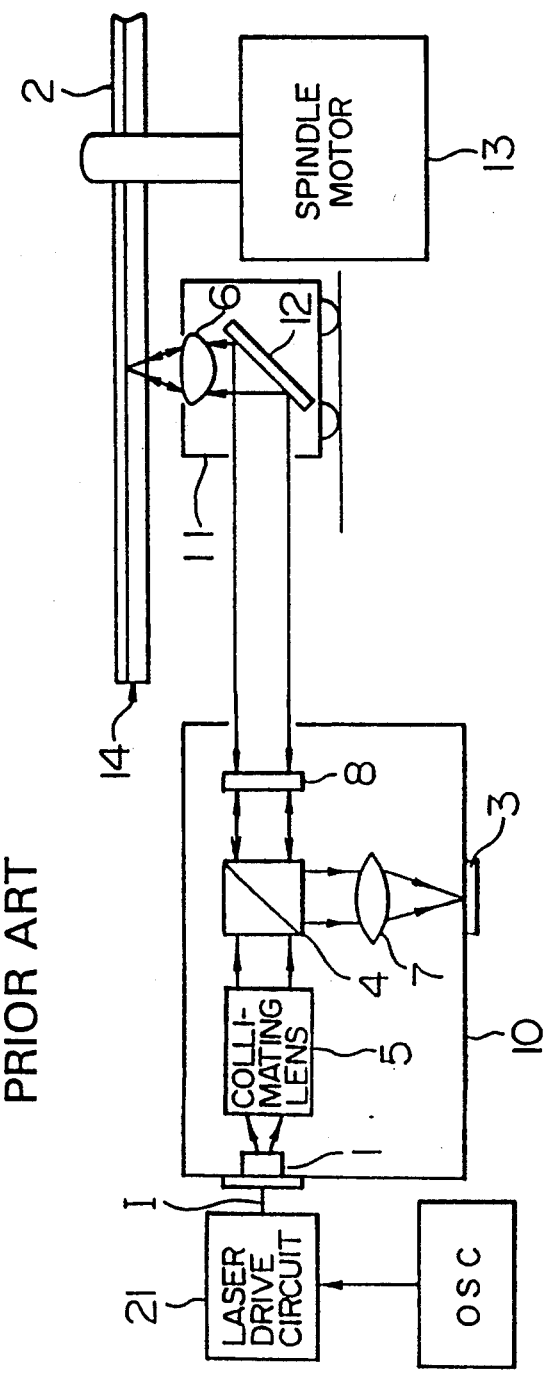
FIG. 4 is a block diagram showing the construction of a prior art optical information recording and reproducing apparatus.

FIGS. 2 and 3 show the second embodiment of the present invention. The construction of the optical pick-up 10, 11 is identical to that of the optical pick-up 10, 11 in the first embodiment shown in FIG. 1. FIG. 3 is a diagram showing waveforms of signals at each part of the diagram shown in FIG. 2.

The following description is of a case where the principal cause of the laser noise is returning light making a single round trip between the semiconductor laser device 1 and the recording medium 2.

It is required to determine a modulation frequency, the laser noise of which is minimized so that the semiconductor laser device 1 does not emit light while the returning light from the recording medium 2 is reenters the emitting surface of the semiconductor laser device 1. Accordingly, the laser noise is removed substantially in this way.

Assuming that the optical length between the semiconductor laser device 1 and the recording medium 2 is L, and the light velocity is c, and the modulation frequency f, the laser noise is minimized in accordance with the relation $f = c/4L$. A rectangular wave oscillator 22 is driven with the optimum modulation frequency in the case where the optical pick-up movable part 11, which is a movable part of the split optics, is located at the average position in the radial direction of the recording medium 2 to obtain an output pulse signal 25. This pulse signal 25 and a delayed pulse signal 26 obtained by delaying the pulse signal 25 by means of a delay line 23 are inputted to an AND circuit 24 to obtain a pulse signal 27. The duty of the pulse signal 27 can be set arbitrarily by regulating the amount of delay by the delay line 23. A current I for driving the semiconductor laser device is obtained by supplying this pulse signal 27 to a laser driving circuit 21. Variations in the pulse waveform indicate dullness of the driving system. Assuming that the threshold current for the laser is It, a laser oscillation is carried out at the region of the current I over It. Therefore, the on-time width of the semiconductor laser device 1 becomes T (on) and the off-time width becomes T (off). At this time, the light outputted by the semiconductor laser device 1 has a beam intensity waveform 28.

The amount of the delay by the delay line 23 is determined as follows.

In the access region of the optical pick-up movable part 11, the minimum value of the optical length is L (min) when the optical pick-up movable part 11 is located at the position 31 shown in FIG. 2. The returning light necessary to make one round trip in for the time T (min) across the optical length L (min) becomes a beam intensity waveform 29 at the light emitting surface of the semiconductor laser device 1. Consequently, unless the on-time T (on) of the semiconductor laser device 1 is shorter than the time T (min), interference is caused between the emitted light and the returning light, which causes laser noise in the semiconductor laser device 1.

On the other hand, in the access region of the optical pick-up movable part 11, the maximum value of the optical length is L (max) when the optical pick-up movable part 11 is located at the position of 32 shown in FIG. 2. The returning light necessary to make one round trip in the time T (max) across the optical length L (max) becomes a beam intensity waveform 30 at the light emitting surface of the semiconductor laser device 1. Consequently, unless the off-time T (off) of the semiconductor laser device 1 is longer than the time T (max), interference is caused between the emitted light and the returning light both superposed on each other, which also causes laser noise in the semiconductor laser device 1.

From the above description, in order that the emitted light is not superposed on the returning light in the whole access region of the optical pick-up movable part 11, the following conditions should be met:

$$T (on) \leq T (min)$$

and $$T (max) \leq T (off)$$

These can be rewritten into;

$$T (on)/T (off) \leq T (min)/T (max)$$

Further, since T (min)/T (max) = L (min)/L (max) in the whole access region of the optical pick-up movable part 11, that is, the optical length L ranges from L (min) to L (max), the following expression is met:

$$T (on)/T (off) \leq L (min)/L (max)$$

The expression is a necessary condition in order that the emitted light is not superposed on the returning light. In the case where the principal cause of the laser noise is based on the returning light of the laser beam making the round trip more than twice between the semiconductor laser device 1 and the recording medium 2, but assuming that the optical length L, L (min) or L (max) is represented by an optical length for making the round trip twice, the above necessary condition can also be applicable.

By using an optical pick-up movable part 11 having the construction satisfying the requirement described above, it is possible to substantially laser noise caused by eliminate returning light. With such an optical information recording and reproducing apparatus, the optimum laser drive can be effected, regardless of the optical pick-up movable part 11, which is the movable part of the split-optics.

Although the pulse oscillation has been described as using an external driving circuit for the semiconductor laser device in the embodiment, in the case where the semiconductor laser device is self-oscillated in a pulsed form, similar effects can also be obtained if control of the self-oscillation frequency or control of the self-pulsation timing is carried out.

By the optical information recording and reproducing method according to the embodiment, it is possible to increase access speed owing to reduction in the weight of the optical pick-up movable part and to realize an optical information recording and reproducing apparatus having a high performance by which laser noise is always suppressed satisfactorily, regardless of the position of the optical pick-up movable part.

What is claimed is:

1. An optical information recording and reproducing method by which a recording medium is irradiated with laser light pulses emitted by a laser device so that information is recorded and reproduced by locally changing characteristics of said recording medium by thermal energy of said laser light pulses, wherein said laser device is oscillated so as to emit laser light pulses and the frequency of an on-off-modulated high-frequency current driving said laser device is controlled depending on an optical length between a light emitting point on said laser device and said recording medium so that returning light reflected by said recording medium arrives at the light emitting point when the laser device is off.

2. An optical information recording and reproducing apparatus according to claim 1, wherein a part of said light beam reenters said light source when said light source emits not light in accordance with said driving frequency.

3. An optical information recording and reproducing apparatus in which a recording medium is irradiated with laser light pulses emitted by a laser device so that information is recorded and reproduced by locally changing characteristics of said recording medium by thermal energy of said laser light pulses, comprising:
   means for on-off modulating light emitted by said laser device at a modulating frequency capable of reducing laser noise;
   means for varying an optical length from a light emitting point of said laser device to said recording medium, wherein said modulating frequency is a function of said optical length;
   means for discriminating said optical length; and
   means for supplying a control signal for controlling the modulating frequency of the light emitted by said laser device to said means for modulating the light emitted by said laser device.

4. An optical information recording and reproducing apparatus according to claim 3, wherein the modulating frequency is greater than 100 MHz.

5. An optical information recording and reproducing apparatus in which a recording medium is irradiated with laser light pulses emitted by a laser device so that information is recorded and reproduced by locally changing characteristics of said recording medium by thermal energy of said laser light pulses, comprising:

means for on-off modulating light emitted by said laser device at a modulating frequency capable of reducing laser noise;

means for varying an optical length from a light emitting point of said laser device to said recording medium, wherein said modulating frequency is a function of said optical length; and means for setting the light modulating means and the optical length varying means according to the following relation:

$$T(on)/T(off) \leq L(min)/L(max)$$

where L (min) represents a minimum value of the optical length; L (max) a maximum value of the optical length; T (on) an on-time width of the light emitted by said laser device; and T (off) an off-time width of the light emitted by said laser device.

6. An optical information recording and reproducing apparatus according to claim 5, wherein the modulating frequency is greater than 100 MHz.

7. An optical information recording and reproducing apparatus, comprising:
   measuring means for measuring an optical length between a light source and a recording medium;
   driving frequency control means for controlling a driving frequency for driving said light source based on said optical length; and
   optical means for conducting a light beam, having the driving frequency, from said light source to said recording medium.

8. An optical information recording and reproducing apparatus according to claim 7, wherein said optics are split into a fixed part and a moving part.

9. An optical information recording and reproducing apparatus according to claim 8, wherein said driving frequency control means comprises:
   selecting means for receiving data representing said optical length, and for selecting frequency-setting data corresponding to said data;
   converting means for converting said frequency-setting data into said driving frequency; and
   means for converting said driving frequency into a driving current for driving said light source.

10. An optical information recording and reproducing method by which a recording medium is irradiated with laser light pulses emitted by a laser device so that information is recorded and reproduced by locally changing characteristics of said recording medium by thermal energy of said laser light pulses, wherein said laser device is oscillated so as to emit laser light pulses and the on-off time of an on-off-modulated high-frequency current driving said laser device is controlled depending on an optical length between a light emitting point on said laser device and said recording medium so that returning light reflected by said recording medium arrives at the light emitting point when the laser device is off.

11. An optical recording and reproducing apparatus, comprising:
   split optics including a fixed part and a movable part;
   said first part including a light source and a first optical system for converting at least a light beam emitted from said light source into a parallel light beam;
   said movable part including a second optical system for focusing said parallel light beam on a recording medium, wherein said optical system moves in a predetermined region along a radial direction of said recording medium; and
   laser driving means for determining and supplying a driving current waveform to said light source depending on said predetermined region.

12. An optical information recording and reproducing apparatus according to claim 11, wherein said predetermined region has a linear dimension that is equal to a difference between a maximum optical length L and a minimum optical length L over which the light beam emitted by said light source travels to said recording medium.

13. An optical information recording and reproducing apparatus according to claim 12, wherein said laser driving means includes means for previously setting the following relation, where T (on) is an on-time width of said light source and T (off) is an off-time width of said light source:

$$T(on)/T(off) \leq L(min)/L(max).$$

14. An optical information recording and reproducing apparatus according to claim 13, wherein a part of the light beam emitted from said light source is reflected from said recording medium, and said reflected light beam part reenters said light source when said light source is off.

15. An optical information recording and reproducing method, comprising the steps of:
   (a) driving periodically a semiconductor laser device to irradiate a light beam emitted by said semiconductor laser device to a recording medium;
   (b) re-entering a part of light reflected from said recording medium into said semiconductor laser device while said semiconductor laser device is not being driven; and
   (c) reproducing information recorded on said recording medium in response to said reflected light part, and recording new information on said recording medium by using said light beam;
   wherein step (a) is effected by means for driving said semiconductor laser device, a fixed optical system including said semiconductor laser device, and a movable optical system moving in a radial direction of said recording medium for scanning said light beam on said recording medium; and
   wherein a driving frequency of said semiconductor laser device is determined in accordance with a position of said movable optical system.

16. An optical information recording and reproducing method according to claim 15, wherein a driving frequency of said semiconductor laser device is determined in accordance with a variation region from said semiconductor laser device to said recording medium.

17. An optical information recording and reproducing method according to claim 16, wherein the following relation is previously set:

$$T(on)/T(off) \leq L(min)/L(max);$$

where L (max) is a maximum optical length, L (min) is a minimum optical length, T (on) is an on-time width of said semiconductor laser device and T (off) is an off-time width of said semiconductor laser device.

* * * * *

UNITED STATES PATENT AND TRADEMARK OFFICE
CERTIFICATE OF CORRECTION

PATENT NO. : 5,313,448
DATED : May 17, 1994
INVENTOR(S) : Hirofumi SUKEDA et al

It is certified that error appears in the above-indentified patent and that said Letters Patent is hereby corrected as shown below: On the title page: Item [22]

Correct the Filing Date to read --June 26, 1992--.

Signed and Sealed this

Eighth Day of November, 1994

*Attest:*

BRUCE LEHMAN

*Attesting Officer*   *Commissioner of Patents and Trademarks*